H. E. ELY, Jr.
TELESCOPE.
APPLICATION FILED APR. 21, 1919.

1,386,611.

Patented Aug. 9, 1921.

INVENTOR.
Hanson E. Ely Jr
BY
Blackwood Bros.,
ATTORNEYS

UNITED STATES PATENT OFFICE.

HANSON E. ELY, JR., OF THE UNITED STATES NAVY.

TELESCOPE.

1,386,611.  Specification of Letters Patent.  Patented Aug. 9, 1921.

Application filed April 21, 1919. Serial No. 291,431.

*To all whom it may concern:*

Be it known that I, Lieut. HANSON E. ELY, Jr., U. S. Navy, residing in the United States, a citizen of the United States, have invented certain new and useful Improvements in Telescopes; and I do hereby declare the following to be a full, clear, and exact description of the invention, such as will enable others skilled in the art to which it pertains to make and use the same.

My invention relates to improvements in telescopes or other sighting instruments, and more particularly to the cross hairs of a telescope.

In sighting instruments, as usually constructed, the cross hairs or wires intersect or cross at a central point which obscures the vision at that point to the extent of the thickness of such lines which is very objectionable.

The object of my invention is to eliminate this objection by providing a sighting instrument with cross hairs or wires which will enable the observer to obtain a perfectly clear view of his point of aim and at the same time centering it in his field of vision.

A further object is to provide a sighting instrument in which the cross hairs or wires terminate at a point short of their usual point of intersection, instead of intersecting, and thereby provide a clear space at the central point in order not to obscure the vision of the observer.

A further object is to provide a sighting instrument in which the cross hairs or wires are etched, inscribed or otherwise formed directly on the lens contained therein.

Referring to the drawings:—

Fig. 2 is a face view of a lens with my invention shown thereon in which the hairs or wires taper approximately from one fourth their length to the point.

Fig. 3 is a face view of a lens with my invention shown thereon in which the hairs or wires taper approximately from one half their length to the point.

Fig. 4 is a face view of a lens with my invention shown thereon in which the hairs or wires taper approximately from three fourths their length to the point.

Fig. 5 is a face view of a lens with my invention shown thereon in which the hairs or wires taper continuously from end to end.

Fig. 6 is a perspective face view of a transparent disk with my invention shown thereon which may be used in place of the lens if desired.

Figure 1:
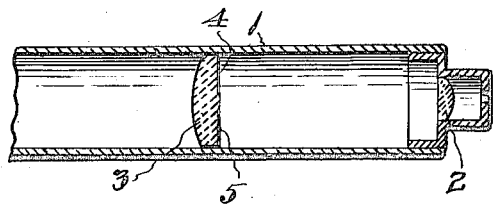
Figure 1 is a longitudinal section of a portion of the tube of a telescope showing my invention therein and constituting one practical embodiment of my invention.
Figure 1:
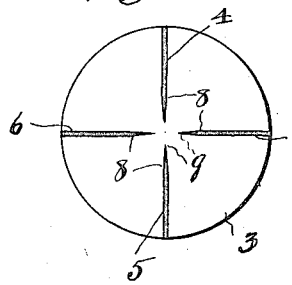
Figure 1:
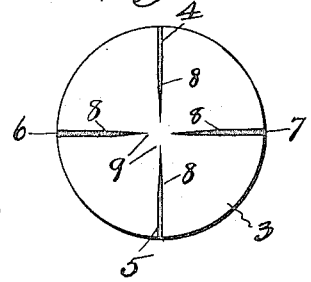
Figure 1:
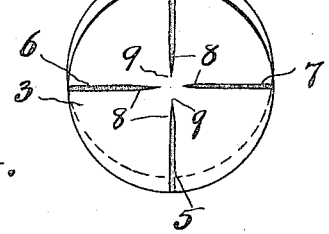
Figure 1:
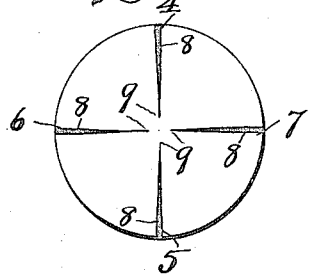
Figure 1:
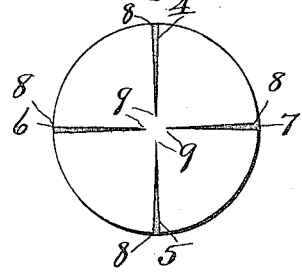

Referring to the drawings, in which like reference characters denote like parts throughout the several views, 1 represents the tube of a telescope of any well known type, provided with the usual eye lens 2 and a field lens or transparent disk 3.

The face, preferably, of the field lens is provided with cross hairs or wires 4, 5, 6, and 7 etched or otherwise formed directly thereon in any desired manner, extending radially 90° apart and of uniform thickness from the circumference of the field inward to a point 8 on each hair or wire, and equidistant from the center; thence tapering inward and terminating and becoming invisible at a point 9 in the central portion of the field of vision.

If desired, the cross hairs or wires may be etched or placed on a plain transparent disk of glass or other material instead of on a lens as shown in Fig. 6.

I do not wish to be understood as limiting myself to the specific details of construction and arrangement as herein described and illustrated, as it is manifest that variations and modifications may be made in the features of construction and arrangement in the adaptation of the device to the various conditions of use without departing from the spirit and scope of my invention and improvements. I, therefore, reserve the right to all such variations and modifications as properly fall within the scope of my invention and the terms of the following claim.

What I claim is:—

In a sighting instrument, transparent means mounted therein, a plurality of cross hairs thereon, each cross hair having a portion tapering toward the center to invisibility and terminating short of the center thereof in order to provide a clear field of vision.

In testimony whereof I have affixed my signature.

HANSON E. ELY, JR.